United States Patent
Jacobsen et al.

(10) Patent No.: US 11,001,455 B2
(45) Date of Patent: May 11, 2021

(54) APPARATUS AND METHOD FOR TRANSFERRING ARTICLES OF THE FISH AND MEAT PROCESSING INDUSTRY TO A PREDETERMINED END POSITION

(71) Applicant: NORDISCHER MASCHINENBAU RUD. BAADER GMBH + CO. KG, Lübeck (DE)

(72) Inventors: Ulf Jacobsen, Bad Schwartau (DE); Ib Verner Dalgaard-Nielsen, Hoerning (DK)

(73) Assignee: NORDISCHER MASCHINENBAU RUD. BAADER GMBH + CO. KG, Lübeck (DE)

( * ) Notice: Subject to any disclaimer, the term of this patent is extended or adjusted under 35 U.S.C. 154(b) by 0 days.

(21) Appl. No.: 16/573,425

(22) Filed: Sep. 17, 2019

(65) Prior Publication Data

US 2020/0102155 A1 Apr. 2, 2020

(30) Foreign Application Priority Data

Sep. 27, 2018 (EP) .................................... 18197344

(51) Int. Cl.
*B65G 47/66* (2006.01)
*A22C 17/00* (2006.01)
*A22C 25/08* (2006.01)

(52) U.S. Cl.
CPC .......... *B65G 47/66* (2013.01); *A22C 17/0093* (2013.01); *A22C 25/08* (2013.01); *B65G 2201/0202* (2013.01)

(58) Field of Classification Search
CPC ...... B65G 17/064; B65G 17/34; B65G 47/38; B65G 47/967; A22C 17/0093; A22C 25/08
See application file for complete search history.

(56) References Cited

U.S. PATENT DOCUMENTS 3,550,751 A * 12/1970 William, Jr. ......... B65G 47/482
198/352
5,842,556 A 12/1998 Van Hattum
(Continued)

FOREIGN PATENT DOCUMENTS

CN 107691610 2/2018
DE 102013017314 4/2015
(Continued)

OTHER PUBLICATIONS

Chilean Office Action / Search Report issued in App. No. 2019-002772 and dated Jul. 15, 2020.

*Primary Examiner* — William R Harp
(74) *Attorney, Agent, or Firm* — Greenblum & Bernstein, P.L.C.

(57) ABSTRACT

An apparatus and method, configured for transferring articles of the fish and meat processing industry in a predetermined end position, including a continuous conveying device with a plurality of transport sections for individually receiving the articles and movable in the conveying direction, which transport sections comprise in the conveying position a transport element pair forming two article support surfaces. Each transport element is configured to be controllably pivotable about axles, running in the edge region of the respective transport section, so that the articles (10) are transferred to the predetermined end position, under the effect of gravity, in a plane lying below the conveying plane by controlled pivoting of both transport elements while retaining the article orientation or by controlled pivoting of one of the respective transport elements of one of the respective transport element pairs while changing the article orientation.

28 Claims, 7 Drawing Sheets

(56) References Cited

U.S. PATENT DOCUMENTS

| | | | | |
|---|---|---|---|---|
| 6,126,017 | A * | 10/2000 | Hours | B07C 3/008 198/370.03 |
| 6,762,382 | B1 * | 7/2004 | Danelski | B07C 5/36 198/370.04 |
| 7,728,244 | B2 * | 6/2010 | De Leo | B07C 3/087 209/3.1 |
| 7,967,149 | B2 | 6/2011 | Helgi | |
| 9,102,428 | B2 | 8/2015 | Grasselli | |
| 9,962,743 | B2 * | 5/2018 | Bombaugh | B07C 3/02 |
| 10,457,487 | B2 * | 10/2019 | Gatz | B65G 47/38 |
| 2009/0026119 | A1 | 1/2009 | Helgi | |
| 2012/0159900 | A1 | 6/2012 | Grasselli | |

FOREIGN PATENT DOCUMENTS

| | | |
|---|---|---|
| EP | 0 742 165 | 11/1996 |
| EP | 2 479 111 | 7/2012 |
| EP | 1 984 122 | 9/2014 |
| KR | 101220937 | 1/2013 |

\* cited by examiner

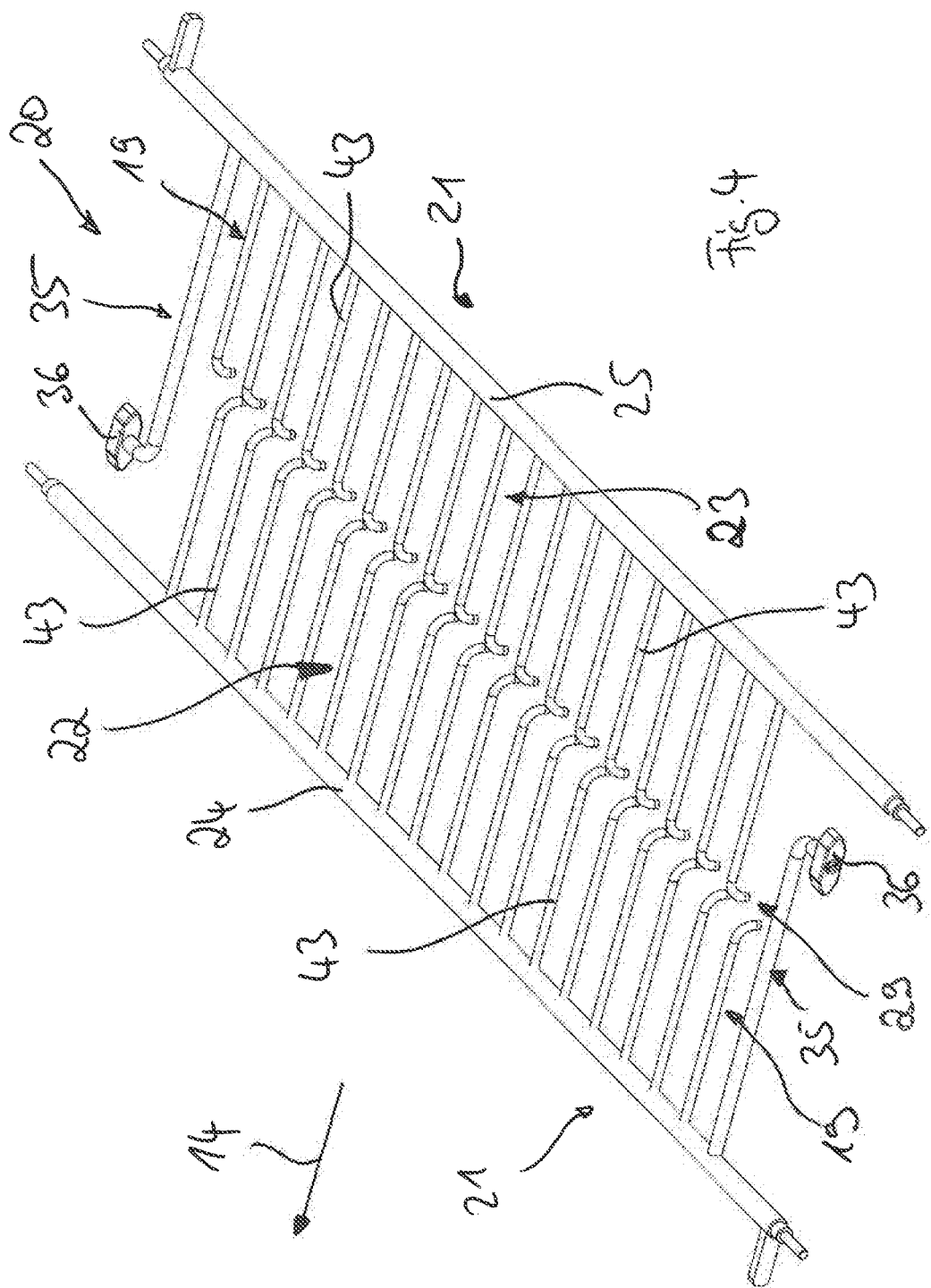

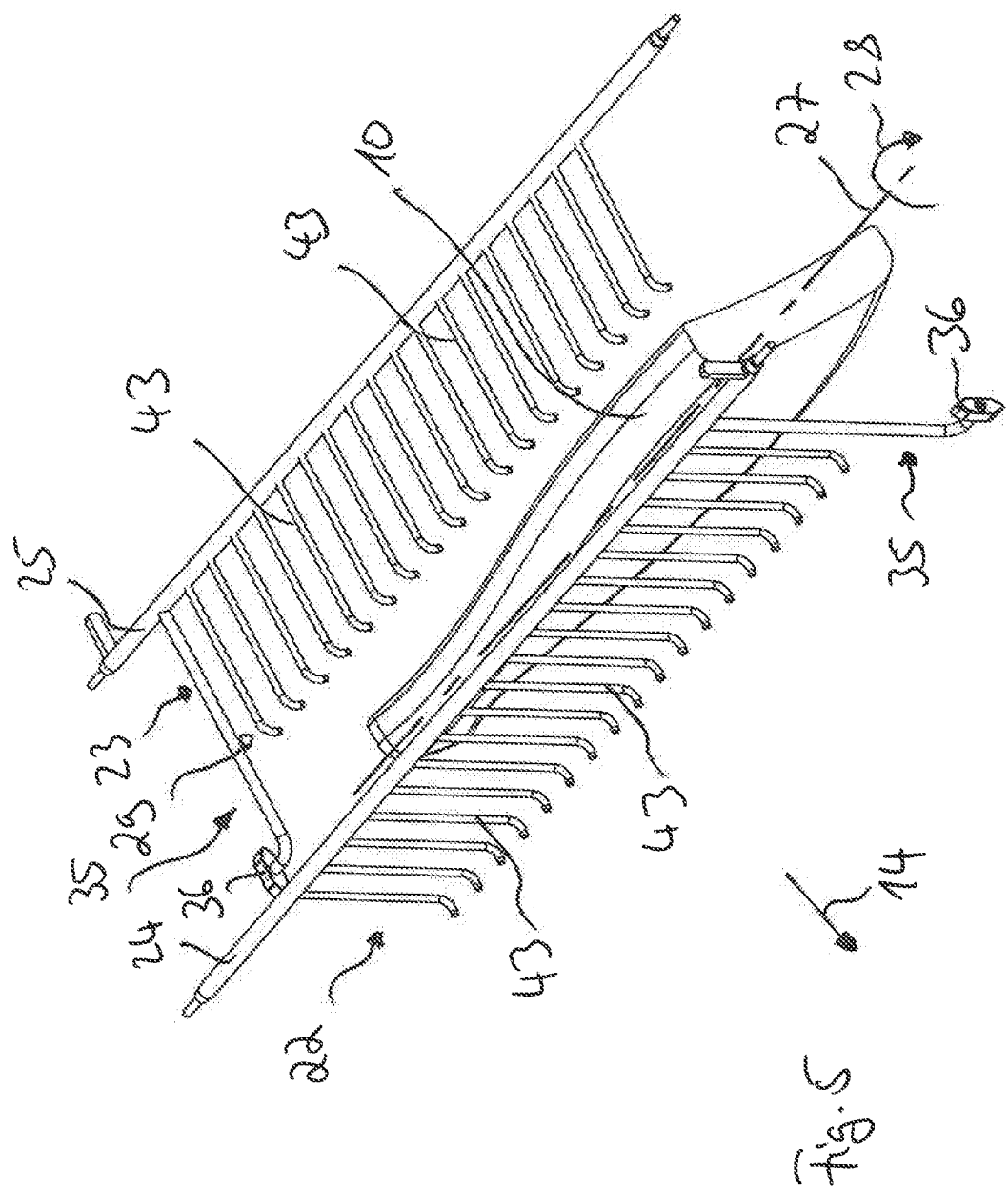

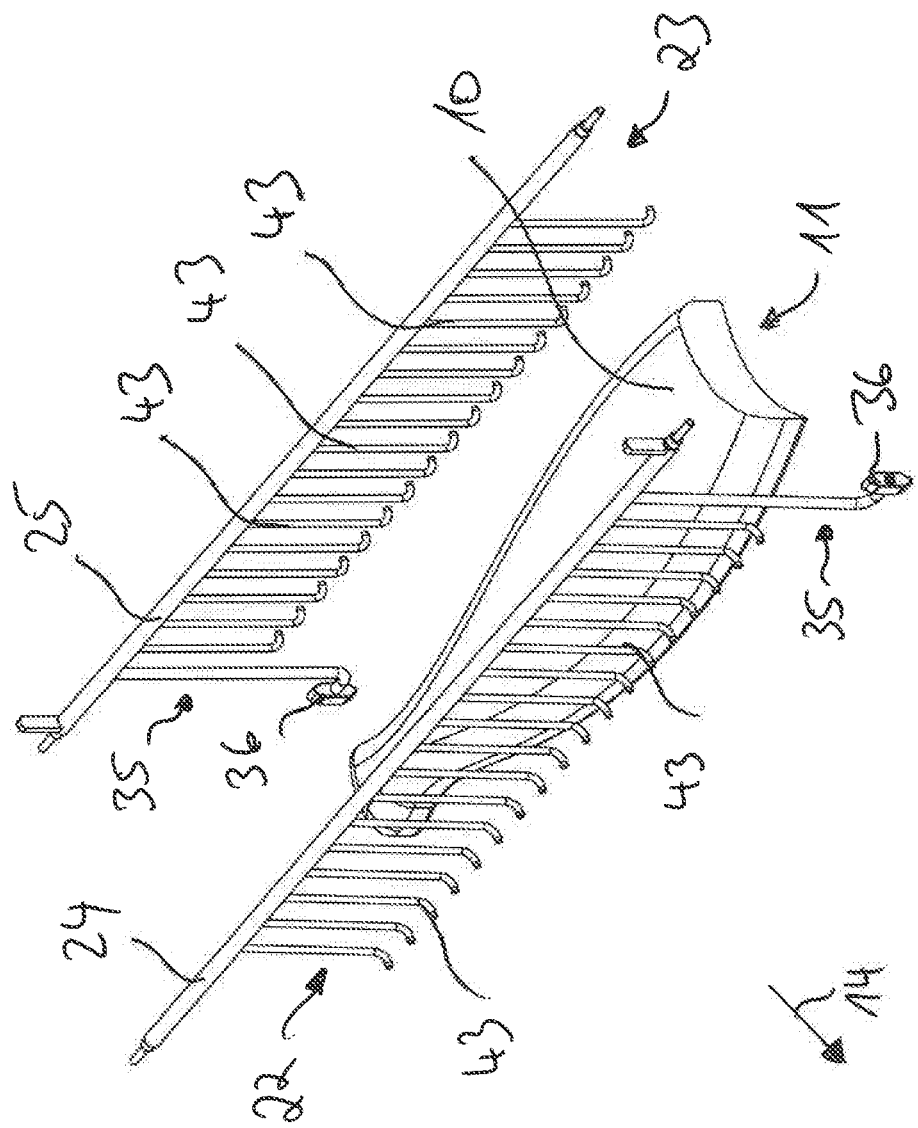

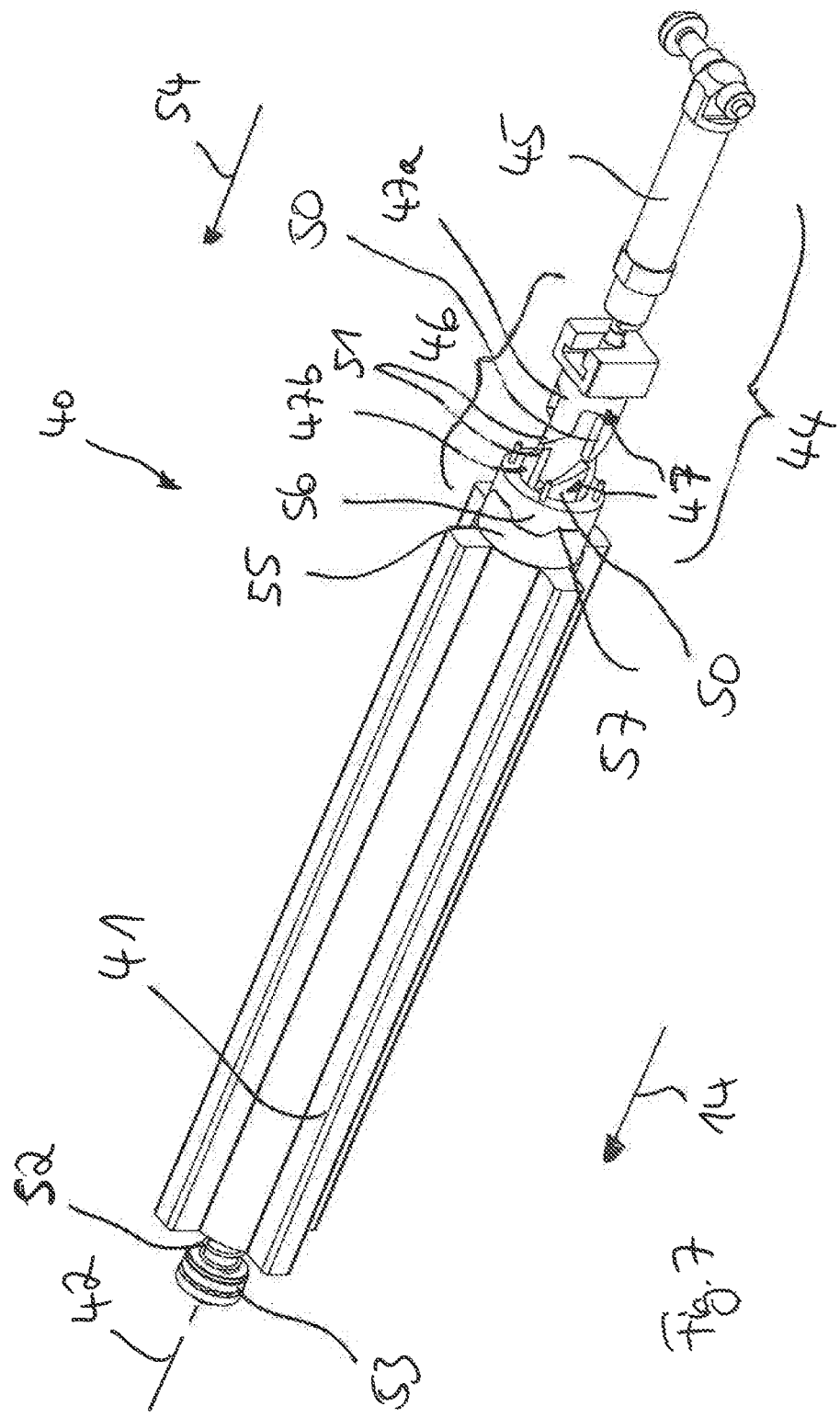

APPARATUS AND METHOD FOR TRANSFERRING ARTICLES OF THE FISH AND MEAT PROCESSING INDUSTRY TO A PREDETERMINED END POSITION

CROSS-REFERENCE TO RELATED APPLICATIONS

The instant application claims the priority benefit under 35 U.S.C 119 of European Application No. 18197344.7-1011 filed Sep. 27, 2018.

BACKGROUND OF THE INVENTION

1. Field of the Invention

The present invention relates to an apparatus configured for transferring articles of the fish and meat processing industry to a predetermined end position.

The invention also relates to a method for transferring articles of the fish and meat processing industry to a predetermined end position.

2. Discussion of Background Information

Such apparatuses and methods are used in the mechanical processing of articles and also intermediate and end products of the fish and meat processing industry. To carry out further processing steps or to place the products in the correct position in transport receptacles or final packaging, it is necessary to transfer the articles to a predetermined end position. For example, when transferring fish fillets into final packaging, it is desirable to place the fish fillets with the skin side facing either downwards or upwards.

Document EP 1 984 122 B1 discloses an apparatus and a method for grading fresh foods based on weight. The fish articles to be distributed are weighed and transferred into various receptacles based on their weight. For controlled transfer of the fish articles into the receptacles, the fish articles lying on a grid structure are pushed off the grid structure by way of a pusher device and then drop, under the effect of gravity, into the relevant receptacle.

The disadvantage is that the orientation of the articles and therefore their end position can only be controlled to a limited extent. Although it is possible to select the relevant target receptacle by way of the time at which the pusher device is activated to discharge the articles, it is not possible to influence the orientation of the articles, in particular it is not possible to turn the articles over during transfer. Thus, the orientation of the articles cannot be changed such that either the skin side or skin-free side of the fillet lies uppermost.

Another disadvantage is that many moving parts are required which come into direct contact with the food articles. To comply with the required hygiene standards, they have to be cleaned and sterilised with the corresponding effort this involves.

SUMMARY OF THE INVENTION

It is therefore the object of the present invention to propose an apparatus by way of which the said articles are transferred to a predetermined end position, the end position being variably controllable both with regard to the transfer point and also the orientation of the articles. In other words, on the one hand, the object is to create an apparatus which ensures precise transfer of the articles to predetermined positions in each case. On the other hand, the object is to be able to predetermine the orientation or alignment of the articles during transfer in a variably controllable manner. It is also the object of the present invention to provide an apparatus whose components are as easy to clean as possible. The object is additionally to propose a corresponding method.

The object is achieved by the apparatus referred to hereinbefore, this comprising a circulating continuous conveying device, designed for conveying the articles in a conveying plane, with a plurality of transport sections, which are configured for individually receiving the articles and are movable in the conveying direction, each of the transport sections comprising in the conveying position a transport element pair forming two article support surfaces, and each transport element of the respective transport element pair being configured to be controllably pivotable about axles, running in the edge region of the respective transport section, in such a manner that the articles are transferred to the predetermined end position in at least one transfer region, under the effect of gravity, in a plane lying below the conveying plane by either controlled pivoting of both transport elements of one of the respective transport element pairs using a control device while retaining the article orientation, or they are transferred to the predetermined end position by controlled pivoting of one of the respective transport elements of one of the respective transport element pairs while changing the article orientation.

The apparatus according to the invention has the advantage that the articles can be transferred precisely to predetermined end positions in one or a plurality of transfer regions. Thus, on the one hand, the control device is used to determine a transfer time based on a predetermined deposit position which takes into account the conveying speed, at which transfer time one or both transport elements of a transport element pair are pivoted out of the conveying position in order to transfer the respective article to the predetermined end position at precisely the predetermined deposit position. On the other hand, the predetermined end position includes a further positioning criterion, namely whether the article should remain in the alignment or orientation in which it is already being conveyed in the conveying position by the conveying device, or whether the article should be turned with regard to its position of underside and upper side during transfer to the end position.

The apparatus according to the invention is particularly suitable for transferring fish fillets with a skin side and a skin-free side into receptacles. With the apparatus according to the invention, it is possible to predetermine the end position of the fish fillets as freely as possible both with regard to their position in the conveying direction and also with regard to their position of skin side and skin-free side. The fillets are preferably conveyed by way of the continuous conveying device transverse to their longitudinal side, i.e. the side running parallel to the longitudinal axis of the fish body.

A further expedient embodiment of the invention is characterised in that the transport elements of the transport element pairs are each inclined towards the centre of the respective transport section in the conveying position in such a manner that the article support surfaces each form a receiving trough for one of the articles. In this way, the transport element pairs are designed as a centring unit which is configured to position the articles centrally in the conveying position in each of the transport sections with respect to both transport elements. Thus, in the conveying position, the articles always assume a defined orientation such that a maximum of positioning accuracy and reliability is achieved while retaining or changing the article orientation. The respective angles of inclination of the transport elements of a transport element pair in relation to the conveying plane are preferably of equal size. Alternatively, the angles of inclination are different, for example to achieve optimum central alignment of articles with asymmetrical article geometry. The respective angle of inclination of the transport elements is also a setting parameter for changing the article orientation when transferring the articles to the predetermined end position. In particular, selecting the angle or angles of inclination determines the amount of torque acting on the article during transfer of the articles while changing the article orientation. With a greater inclination in relation to the conveying plane, the respective transport element presents a more steeply sloping inclined plane, such that the article is subject to correspondingly higher acceleration which centrally determines the strength of the intrinsic rotation of the article during the drop phase until the end position is reached. The angle of inclination of the transport element preferably determines the extent of rotation of the article, which is not pivoted, during transfer.

According to a further preferred embodiment, the conveying device comprises two circulating drive belts arranged parallel to each other and extending in the conveying direction, between which the transport elements are pivotably arranged about the axles running in the edge region of the respective transport section. The drive belts are preferably manufactured as drive straps, for example of polyurethane or a comparable material with regard to flexibility. Thus, the drive belts fulfil a dual function: on the one hand, the rotationally driven drive belts are used to transport the transport elements in the conveying direction; on the other hand, the drive belts are configured as pivot bearings for the said axles of the transport elements. The pivot bearings are formed, for example, by protruding moulded bearing parts, integrally formed at regular intervals on the drive belts, in which the axles of the transport elements are pivotably mounted. The moulded bearing parts may, for example, be welded on. Further preferably, the moulded bearing parts are provided with corresponding plain bearings.

Further preferably, the drive belts—with the exception of the said moulded bearing parts—are flat and level. This has a particularly positive effect on the regularly increased hygiene requirements in the food processing sector. The smooth surfaces of the drive belts provide little purchase for dirt with the result that both the adhesion of dirt is reduced and the cleaning effort is also significantly diminished. Particularly when using drive belts with reinforcement, for example of steel, stainless steel, Kevlar or comparable materials, this reinforcement is embedded in a layer of plastic. Here, too, the flat level design of the drive belts has a positive effect overall. The use of these drive belts is clearly superior to using toothed belts, since the toothed belts have small notches in the toothed belt valleys, for example for fixing the reinforcement, and the plastic sheath frequently tends to form notches and cracks in the plastic surface there due to the mechanical loads occurring in toothed belts because of their geometry, which notches and cracks encourage the accumulation of dirt and germs.

According to another preferred embodiment of the invention, the continuous conveying device comprises two guide elements each extending in the conveying direction and arranged in parallel below the drive belts, which guide elements are configured for sliding guidance of deflecting elements arranged on the transport elements. In other words, the guide elements form an underpass which is arranged below the guide plane and the drive belts and is oriented parallel to the conveying plane. The distance between the conveying plane and the top side of the guide elements influences the size of the angles of inclination of the transport elements.

According to another preferred embodiment of the invention, the deflecting elements are each arranged on the transport elements of one of the transport element pairs on opposing guiding sides of said transport elements. In this manner, each of the transport elements is assigned to a guiding side. For example, the respective leading transport elements in the conveying direction are guided by the guide elements arranged on the right side, while the respective trailing transport elements are guided on the left side. Alternatively, this assignment can be reversed. Advantageously, all respective leading transport elements are thus guided by way of one of the conveying sides, while the respective trailing transport elements are guided by way of the respective other conveying sides.

A further expedient embodiment of the invention is characterised in that the guide elements each comprise a stationary guide rail and, in the at least one transfer region, at least one adjustment element which is designed to be controllably movable using the control device and which is configured to guide the deflecting elements slidingly in a guiding position and to release guidance of the deflecting elements in a deflecting position. The control device is therefore designed in each case to leave the deflecting elements in the guiding position in the conveying position. If an article is to be transferred, the control device causes the respective deflecting element to move into a deflecting position in which the respective deflecting element is no longer guided, so that the associated transport element automatically pivots downwards onto the transport element following the effect of gravity and, if necessary, due to the effect of the weight force of the article.

According to another preferred embodiment, the adjustment elements have at least one guide surface which is configured to be controllably pivotable using the control device about an axis of rotation running in the conveying direction. The guide surfaces preferably extend in the conveying direction and connect directly to the stationary guide rail, at least in the conveying position or the guiding position of the adjustment elements. By pivoting the guide surface about the said axis of rotation using the control device, the guide surface is rotated relative to the guide rail, preferably by an angle of 90°, such that the respective deflecting element is not further guided by the guide rail. In this way, a simply designed, compact and reliable construction of the adjustment element is provided.

According to a further preferred embodiment, the adjustment elements are formed in the manner of a cross in the cross-section containing the axis of rotation. The adjustment element is preferably designed as a longitudinal profile element which comprises four each of the guide surfaces, each of which is offset by 90°, which are arranged in the manner of a cross in cross-section. In this way, in the angle positions 0°, 90°, 180° and 270°, the guide surface of the adjustment element is aligned flush with the stationary guide rail and thus forms a continuous sliding guide surface. In the angle positions 45°, 135°, 225° and 315°, the adjustment element no longer engages with one of the guide surfaces and guidance of the deflecting elements is, as previously described, released.

Further preferably, the transport elements are formed in the manner of a grid. This has the advantage of a low dead weight of the transport elements. In addition, the transport elements are easy and inexpensive to manufacture and easy to clean. Alternatively, the transport elements are formed full-surface and made, for example, of plastic or sheet metal.

A further expedient embodiment of the invention is characterised in that the axles running in the edge regions of the respective transport section of one each of the transport elements of one of the transport element pairs are rod-shaped and are arranged on both sides of the drive belts by way of pivot bearings. The axles thus form an integral part of the transport elements designed in the manner of a grid. The respective axles are themselves part of the grid structure of the transport elements. No separate attachments are necessary which means that the transport elements are easy and inexpensive to manufacture as well as easy to clean so that the increased hygiene standards in the food industry are always maintained. Further preferably, in the same way, the deflecting elements are also rod-shaped.

A further expedient embodiment of the invention is characterised in that, for controlling the adjustment elements, the control device is operatively connected in each case to a drive unit, the drive unit comprising a controllable actuator for producing a transverse movement and a conversion unit configured to convert the transverse movement into a rotational movement, said conversion unit being configured to pivot the at least one guide surface of the adjustment element about the axis of rotation. This has the advantage that inexpensive actuators, which are not subject to any special requirements with regard to their positioning accuracy, can be used to control the adjustment element. In this way, the actuator is uncoupled from the controller of the deflecting element to such an extent that any inaccuracies in the transverse movement produced by the actuator do not directly affect the positioning accuracy of the adjustment elements.

According to an advantageous development of the invention, the conversion unit comprises two curve control parts, a first curve control part being arranged on the actuator and a second curve control part being arranged on the adjustment element; the curve control parts having correspondingly formed cam pairs directed towards each other. In a particularly simple structural manner, the transverse movement produced by the actuator is thus converted into a rotational movement to control the position of the adjustment elements.

An advantageous embodiment of the invention is characterised in that a first of the cam pairs is configured to convert the transverse movement of the actuator into a rotational movement of the second curve control part relative to the first curve control part and a second of the cam pairs is configured to transfer the transverse movement of the actuator to the second curve control part in the operating direction of the actuator. In other words, on the one hand, the conversion unit is configured to transfer the transverse movement of the actuator in the operating direction to the adjustment element and, on the other hand, also to pivot the adjustment element accordingly. The conversion unit is thus configured to cause, from the transverse movement of the actuator, an overall movement of the adjustment element which is overlaid with a transverse movement and a rotational movement.

According to an advantageous embodiment of the invention, it is provided that the adjustment element is spring-tensioned so as to be axially displaceable against the operating direction of the actuator by way of a spring element and an axial bearing, such that in the guiding position the adjustment element is in the idle position in respect of its axial position, while in the deflecting position the adjustment element is in a released position in respect of its axial position.

This has the advantage that the adjustment element is configured to be movable in the axial direction between an idle position and a released position. In order to achieve axial adjustability of the adjustment elements, it is necessary to provide appropriate empty spaces in the axial direction. The axial extension of these empty spaces is preferably dimensioned such that the deflecting elements slide over these empty spaces unaffected while retaining the guiding effect so that displacement in the axial direction has no effect on guidance of the deflecting elements.

Another preferred embodiment of the invention is characterised in that a first control crown is arranged on the adjustment element, said first control crown being configured in the idle position with positive locking engagement in a stationary second control crown for locking the rotation of the first control crown, and the control crowns being further configured to assume a non-positive locking state in the released position. The control crowns form a kind of forced locking by way of which the adjustment elements are automatically aligned exactly and with high precision in respect of their rotational position. The positioning accuracy is thus determined by the geometry of the control crowns and therefore is not dependent on the positioning accuracy of the actuator. In this way, inexpensive actuators can be used.

Furthermore, the object is achieved by a corresponding method for transferring articles of the fish and meat processing industry to a predetermined end position having the features referred to hereinbefore, comprising the steps: Conveying the articles in a conveying plane by way of a circulating continuous conveying device with a plurality of transport sections, which are configured for individually receiving the articles in a conveying direction, each of the transport sections comprising in the conveying position a transport element pair forming two article support surfaces, and each transport element of the respective transport element pair being configured to be controllably pivotable about axles running in the edge region of the respective transport section; optional controlled transfer of the articles under the effect of gravity into the predetermined end position in at least one transfer region in a plane situated below the conveying plane by either controlled pivoting of both transport elements of one of the respective transport element pairs using a control device while retaining the article orientation; or by controlled transfer of the articles into the predetermined end position by optional controlled pivoting of one of the respective transport elements of one of the respective transport element pairs while changing the article orientation.

The advantages associated with the method according to the invention have already been described in detail above in connection with the apparatus according to the invention, to which reference is therefore made here.

A preferred development of the invention is characterised by centring the articles in the conveying position by inclining the transport elements of the respective transport element pairs towards the centre of the respective transport section in each case, such that the article support surfaces each form a receiving trough for one of the articles.

Another expedient embodiment of the invention is characterised by driving the transport elements of the continuous conveying device by way of circulating drive belts arranged parallel to each other and extending in the conveying direction, between which the transport elements are pivotable about the axles running in the edge region of the respective transport section.

A further expedient embodiment of the invention is characterised by sliding guidance of deflecting elements arranged on the transport elements by way of two guide elements of the continuous conveying device, extending in each case in the conveying direction and arranged in parallel below the drive belts.

According to another preferred embodiment of the invention, the deflecting elements are each guided on one side on opposing guiding sides of the transport elements of one of the transport element pairs.

A preferred development of the invention is characterised by sliding guidance of the deflecting elements in a guiding position by way of a respective stationary guide rail of the guide elements and enabling of the deflecting elements in a deflecting position in the transfer region by way of at least one adjustment element which can be controlled via the control device.

According to another preferred embodiment of the invention, at least one guide surface of the adjustment elements is controllably pivoted by way of the control device about an axis of rotation running in the conveying direction.

A further expedient embodiment of the invention is characterised by controlling a drive unit using the control device to produce a transverse movement by way of a controllable actuator and conversion of the transverse movement into at least one rotational movement by way of a conversion unit configured therefor, in order to pivot the at least one guide surface of the adjustment element about the axis of rotation.

A further expedient embodiment of the invention is characterised in that the at least one rotational movement is produced by way of two curve control parts of the conversion unit, in that a first curve control part is arranged on the actuator and a second curve control part is arranged on the adjustment element; the curve control parts having correspondingly formed cam pairs directed towards each other.

Another preferred embodiment of the invention is characterised by converting the transverse movement of the actuator into a rotational movement of the second curve control part relative to the first curve control part by way of a first cam pair and transferring the transverse movement of the actuator to the second curve control part in the operating direction of the actuator.

According to another preferred embodiment of the invention, in the guiding position the adjustment element is in idle position in respect of its axial position, while in the deflecting position the adjustment element is in a released position in respect of its axial position, in that the adjustment element is spring-tensioned so as to be axially displaceable against the operating direction of the actuator by way of a spring element and an axial bearing.

An advantageous embodiment of the invention is characterised by positive locking engagement in a stationary second control crown for locking the rotation of the first control crown in the idle position and for setting the control crowns of a non-positive locking state in the released position.

The advantages associated with the previously mentioned embodiments of the method according to the invention have already been described in detail above in connection with the apparatus according to the invention, with the result that reference is made here to the advantages mentioned there to avoid repetitions.

BRIEF DESCRIPTION OF THE DRAWINGS

Further preferred and/or expedient features and embodiments of the invention emerge from the dependent claims and the description. Especially preferred embodiments are explained in greater detail with reference to the attached drawing. The drawing shows:

FIG. 4 shows a detailed view of a transport element pair in the conveying position, FIG. 5 shows a detailed view of a transport element pair during transfer of an article while changing the article orientation, FIG. 6 shows a detailed view of a transport element pair during transfer of an article while retaining the article orientation and FIG. 7 shows a detailed view of the adjustment element with drive unit.

DETAILED DESCRIPTION OF THE INVENTION

Figure 1:
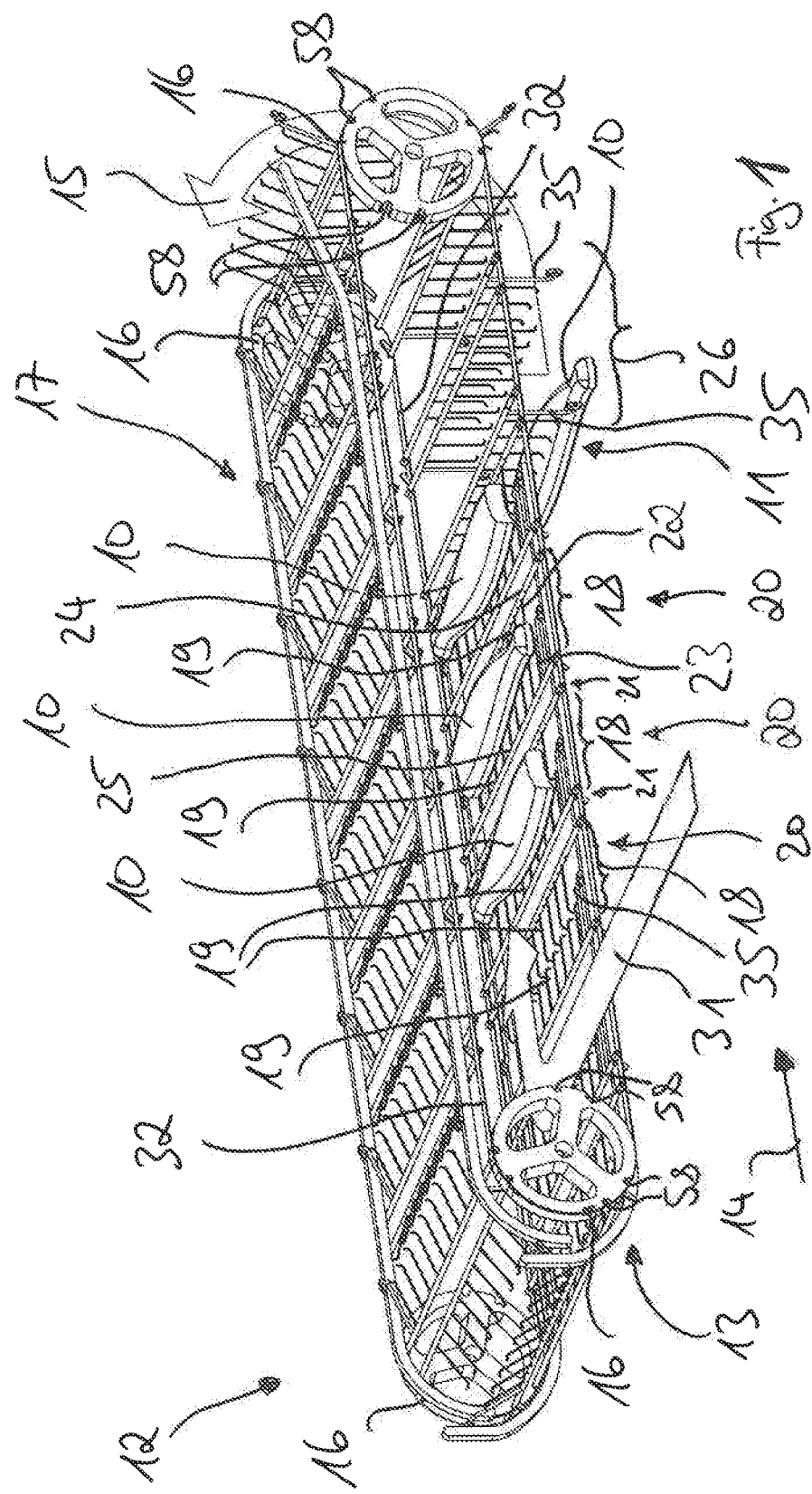
FIG. 1 shows a perspective view of the apparatus according to the invention.

The device according to the invention and the method according to the invention will be described in greater detail in the following. The drawing shows, in particular, variations of the apparatus according to the invention, based on which, however, the process sequence according to the invention also emerges.

FIG. 1 shows a perspective view of the apparatus according to the invention. The apparatus is configured for transferring articles 10 of the fish and meat processing industry to a predetermined end position 11. The apparatus according to the invention is preferably configured for transferring fish fillets. As FIG. 1 shows, the apparatus comprises a circulating continuous conveying device 12 which is designed to convey the articles 10 in a conveying plane 13 in conveying direction 14.

As can be seen from FIG. 1, the continuous conveying device 12 preferably comprises deflecting wheels 16, by way of which a circulating continuous conveying operation is realised via return path 17 in counter-conveying direction 15.

The continuous conveying device 12 preferably comprises a plurality of transport sections 18 which are configured for individually receiving the articles 10. The transport sections 18 are configured to be movable in conveying direction 14. In the conveying position shown in FIG. 2, each of the transport sections 18 forms a transport element pair 20 forming two support surfaces 19 for one each of the articles 10. Each of the transport element pairs 20 comprises two respective transport elements 22, 23, which are each configured to be controllably pivotable about axles 24, 25 running in the edge region 21 of the respective transport section 18.

Figure 3:
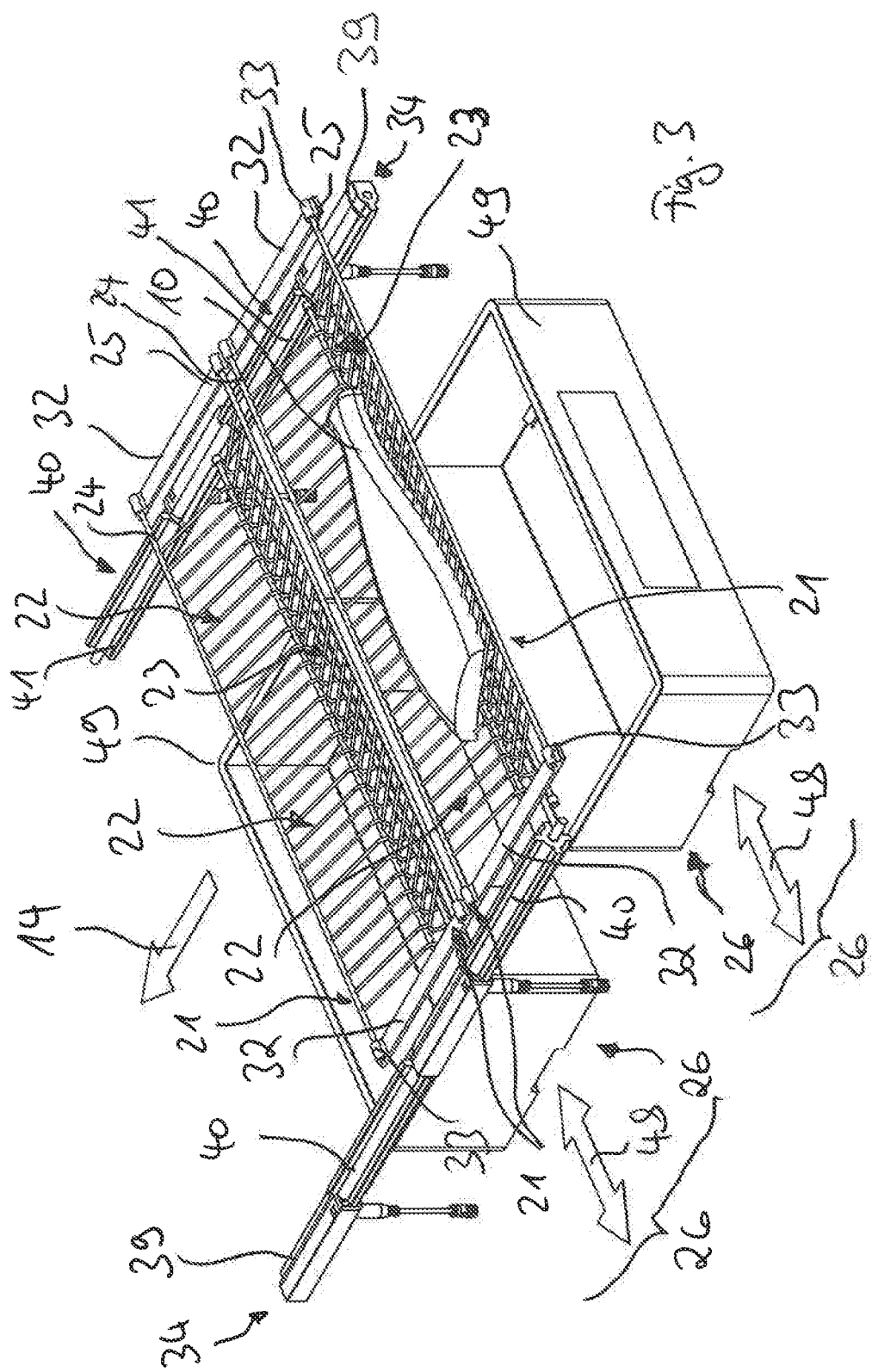
FIG. 3 shows a detailed view shown in FIG. 2 in two transfer regions.

As shown in FIG. 3, the transport elements 22, 23 of one of the transport element pairs 20 are configured to be controllably pivotable in such a way that the articles 10 can be transferred in a variably controllable manner in at least one transfer region 26, under the effect of gravity, to a plane situated below the conveying plane 13 by optional controlled pivoting of one or both transport elements 22, 23 of one of the transport sections 18.

The number of transfer regions 26 can be extended arbitrarily. As shown for example in FIG. 3, two of the transfer regions 26 can be provided. The number of transfer regions 26, however, can be freely selected as required and is not limited to the examples above.

FIG. 4 shows a partial view of one of the transport element pairs 20 in the conveying position. Both of the transport elements 22, 23 form the article support surfaces 19, by way of which the article 10, not shown in FIG. 4, is supported. As shown in FIG. 5, the article 10 is transferred to the end position 11 while changing the article orientation by optional controlled pivoting of one of the transport elements 22. Due to this one-sided "removal" of the supporting function of the one transport element 22, the article 10 receives a rotational impulse in the direction of rotation 28 about the longitudinal axis 27 of the article indicated in FIG. 5.

The drop height between the conveying plane 13 and the plane lying below this conveying plane 13, which is not explicitly shown in the Figures, must always be dimensioned such that sufficient time remains during the free fall of the article 10 to change the alignment or orientation of said article 10 during its passage through the corresponding drop path.

The article orientation is retained by optional controlled pivoting of both of the transport elements 22, 23 of one of the respective transport element pairs 20 using the control device. The article 10 is transferred to the predetermined end position 11 without changing its alignment or orientation, as shown schematically in FIG. 6. "Folding down" of the transport elements 22, 23 on both sides has the effect that no additional rotational impulse acts on the article 10 and it is transferred to the predetermined end position 11 in a purely translational movement following the force of gravity.

As already described hereinbefore, the exact end position is controlled in the conveying direction 14 by choosing a suitable transfer time using the control device.

As shown in FIG. 3, the transport elements 22, 23 of the transport element pairs 20 are each inclined towards the centre 29 of the respective transport section 18 in the conveying position in such a manner that the article support surfaces 19 each form a receiving trough 30 for one of the articles 10.

For the sake of clarity, the feeding in of articles 10 to be transferred by way of the apparatus according to the invention is only indicated in FIG. 1 by the feed-in device 31 which is represented schematically. Such feed-in device 31 are sufficiently well known in prior art; any types of continuous conveying devices 12 may be used. The feed-in device 31, as indicated in FIG. 1, is preferably arranged transverse to the conveying direction 14 of the continuous conveying device 12.

FIG. 1 shows by way of example that the articles 10 are fed in using the feed-in device 31 between the conveying plane 13 and the return path 17 of the continuous conveying device 12 situated above it. The present invention, however, is not limited to this feed-in arrangement. Rather, in the context of the present invention, it is also provided to arrange the return path 17 below the conveying plane 13.

In this case, not shown in the drawing, the articles 10 are conveyed in by way of feeding device 31 arranged above the conveying plane 13, while the plane lying below the conveying plane 13, in which the articles 10 achieve the predetermined end position 11 after transfer, is situated between the conveying plane 13 on the one hand and the return path 17 lying below it on the other hand.

Preferably, receptacles 49, into which the articles 10 are transferred, are arranged in the plane lying below the conveying plane 13. The receptacles 49 are configured via transport and conveying systems, not shown in the drawing, to be movable in the direction indicated by the arrows 48.

The continuous conveying device 12 preferably comprises, as shown in FIG. 1, two circulating drive belts 32 arranged parallel to each other and extending in the conveying direction 14. As can be seen from FIG. 2, the transport elements 22, 23 are pivotably arranged between these drive belts 32. For this purpose, the axles 24, 25 of the transport elements 22, 23, which each run in the edge regions 21 of the respective transport element pair 20, are arranged on the drive belts 32 forming a pivot bearing 33.

According to the preferred embodiments of the present invention shown in the drawing, the pivot bearings 33 are formed, for example, by protruding moulded bearing parts integrally formed at regular intervals on the drive belts 32 in which the axles 24, 25 of the transport elements 22, 23 are pivotably mounted. Alternatively, the pivot bearings 33 can also be designed differently, for example as pivot bearing bushes which are frictionally and/or positively bonded to the drive belts 32.

The deflecting wheels 16 preferably have recesses 58 which are configured to Receive the pivot bearings 33 as the drive belts 32 rotate around the deflecting wheels 16, in order to bring about full-surface contact between each drive belt 32 and the respective deflecting wheel 16.

It can be seen from FIG. 3 that the continuous conveying device 12 comprises two guide elements 34 each extending in the conveying direction 14 and arranged in parallel below the drive belts 32. The guide elements 34 are configured for sliding guidance of deflecting elements 35 arranged on the transport elements 22, 23. Further preferably, a sliding shoe element 36 is arranged in each case on the free end of the deflecting elements 35. The guide elements 34 support the transport elements 22, 23, against the force of gravity via the deflecting element 35 such that, in the conveying position, the transport elements form the previously described article support surfaces 19.

Figure 2:
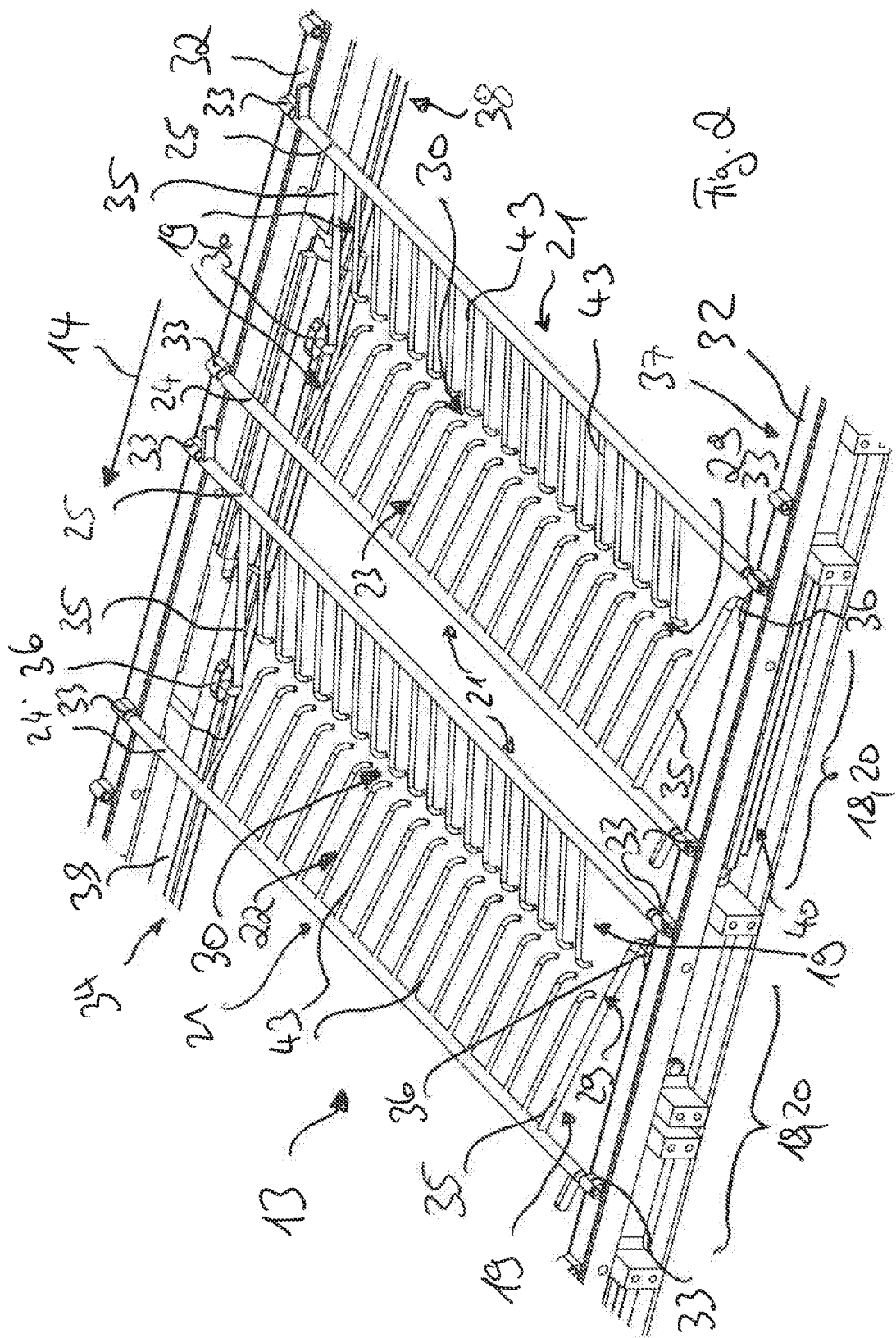
FIG. 2 shows a detailed view of a partial section of the apparatus according to the invention with two transport sections in the conveying position.

The deflecting elements 35 are preferably each arranged on opposing guiding sides 37, 38 of the transport elements 22, 23 of one of the respective transport element pairs 20. As shown by way of example in FIG. 2, the deflecting element 35 of the transport element 22 viewed in the conveying direction 14 is arranged on the left-hand guiding side 37, while the deflecting element 35 of the transport element 23 is arranged on the right-hand guiding side 38. The arrangement of the deflecting elements 35 is not limited to the assignment to the guiding sides 37, 38 which is shown in FIG. 2. Rather, it is possible to swap the assignment of left-hand guiding side 37 and right-hand guiding side 38 to the respective deflecting elements 35.

FIG. 3 shows that the guide elements 34 each have a stationary guide rail 39 and, in the at least one transfer region 26, at least one adjustment element 40. The adjustment element 40 is designed to be controllably movable such that it is adjustable by the control device. Thus, the adjustment element 40 is configured to guide the deflecting elements 35 slidingly in a guiding position and to enable guidance of the deflecting elements 35 in a deflecting position. The positions of the transport elements 22, 23 emerging as a result are shown schematically in FIGS. 4, 5 and 6.

If the respective deflecting element 35 is in the guiding position, the deflecting elements 35 are guided slidingly, and the transport elements 22, 23 form the previously described article support surfaces 19. The article support surfaces 19 may be orientated horizontally or substantially horizontally, as shown by way of example in FIG. 4, or they may be inclined towards the centre 29 of the respective transport section 18, forming the previously described receiving trough 30.

If one of the deflecting elements 35 is in the deflecting position, for example the deflecting element 35 of the transport element 22 as shown in FIG. 5, then enabling the guidance of the deflecting element 35 results in the transport element 22 being pivoted about the axle 24 following the force of gravity. If on the other hand, as shown in FIG. 6, both the deflecting element 35 of the transport element 22 and also the deflecting element 35 of the transport element 23 are controlled into the deflecting position, then both transport elements 22, 23 pivot substantially simultaneously about the respective axles 24, 25.

As can be seen from FIG. 7, the adjustment element 40 has at least one guide surface 41. Advantageously, the adjustment element 40, as shown in the drawing, comprises a total of four of the guide surfaces 41. The guide surfaces 41 are configured to be controllably pivotable by the control device about the axis of rotation 42 running in the conveying direction 14.

The transport elements 22, 23 are preferably formed in the manner of a grid. One possible embodiment of this grid-like structure of the transport elements 22, 23 is shown in FIGS. 4, 5 and 6. The support surfaces 19 of the transport elements 22, 23 are formed by a parallel arrangement of a plurality of grid struts 43.

Further preferably, the grid struts 43 are arranged at right angles on the axles 24, 25 which are rod shaped. The rod-shaped axles 24, 25 therefore have the function of a main strut at the same time in order to thus maintain the arrangement of the grid struts 43. The deflecting elements 35 are also preferably rod-shaped.

FIG. 7 shows a detailed view of the adjustment element 40 with a drive unit 44. For controlling the adjustment elements 40, the control device is operatively connected to the drive unit 44 in each case. The drive unit 44 comprises a controllable actuator 45, which is configured to produce a transverse movement. Furthermore, the drive unit 44 comprises a conversion unit 46 designed and configured to convert the transverse movement into a rotational movement. The actuator 45 may be designed, for example, as a pneumatic or hydraulic cylinder, or as a push-pull electromagnet.

The conversion unit 46 comprises two curve control parts 47, which are fitted with corresponding curve profiles for converting the transverse movement into the rotational movement. As shown in the drawing, the curve control parts 47 are matched to the number of the guide surfaces 41 such that every time the actuator 45 moves back and forth, the guide surfaces 41 are each pivoted step-by-step by 90 degrees about the axis of rotation 42.

The conversion unit 46 preferably comprises two curve control parts 47. A first curve control part 47a is arranged on the actuator 45 and a second curve control part 47b is arranged on the adjustment element 40. The curve control parts 47a, 47b have correspondingly formed cam pairs 50, 51 directed towards each other.

Advantageously, the adjustment element 40 is spring-tensioned so as to be axially displaceable against the operating direction 54 of the actuator 45 by way of a spring element 52 and an axial bearing 53. The adjustment element 40 can thus be moved axially between an idle position and a released position. In the guiding position, the adjustment element 40 is in the idle position in respect of its axial position, while in the deflecting position the adjustment element is in the released position in respect of its axial position. FIG. 7 shows only the idle position. If the adjustment element 40 is transferred into the released position, it is moved in the operating direction 54 or the conveying direction 14 and the spring element 52 is compressed accordingly.

A first control crown 55 is preferably arranged on the adjustment element 40, which first control crown is configured in the idle position with positive locking engagement in a stationary second control crown 56 for locking the rotation of the first control crown 55. The control crowns 55, 56 are furthermore configured to assume a non-positive locking state in the released position which is not shown in the drawing. In other words, in the released position, the control crowns 55, 56 separate completely along the contour line 57 shown in FIG. 7 so that the two control crowns 55, 56 come completely clear mechanically and the locking effect present in the idle position is cancelled completely.

As can be seen from contour line 57, the control crowns 55, 56 have a stepped transverse profile. The number of lowered and raised areas preferably corresponds in each case to the number of guide surfaces 41 of the adjustment element 40. As shown in the drawing, the adjustment element 40 preferably comprises four of the guide surfaces, such that each of the control crowns 55, 56 has a transverse profile each with four lowered and four raised areas. The transitions between a lowered and a raised area of the transverse profile are formed by sloping surfaces. Together with the spring pre-tensioning by the spring element 52, the sloping surfaces cause the control crowns 55, 56 to be brought largely automatically into a locking position. The rotational movement of the adjustment element 40 initiated by way of the actuator 45 therefore does not actually have to take place completely. It is already sufficient to rotate the adjustment element 40 only so far that the control crowns 55, 56 automatically continue to advance the rotation until they are in the idle position again.

The invention claimed is:

1. Apparatus configured for transferring articles used in fish and meat processing industry to a predetermined end position, said apparatus comprising
 a circulating continuous conveying device configured to convey the articles in a conveying plane with a plurality of transport sections, which are configured for individually receiving the articles and which are configured to be movable in a conveying direction; and
 each of the transport sections comprises, in a conveying position, a transport element pair forming two article support surfaces and each transport element of the transport element pair is configured to be controllably pivotable about respective axles, running in an edge region of the respective transport section, each transport element having a form in a manner of a grid,
 wherein the articles are transferred into the predetermined end position in at least one transfer region under the effect of gravity in a plane lying below the conveying plane by either:
 controlled pivoting of the pair of transport elements using a control device while retaining an article orientation, or
 controlled pivoting of one of the respective transport elements using a control device while changing an article orientation.

2. The apparatus according to claim 1, wherein the transport elements are each inclined towards a center of the respective transport section in the conveying position in such a manner that the article support surfaces each form a receiving trough for one of the articles.

3. The apparatus according to claim 1, wherein the continuous conveying device comprises two circulating drive belts arranged parallel to each other and extending in the conveying direction, between which the transport elements are pivotably arranged about the respective axles.

4. The apparatus according to claim 3, wherein the continuous conveying device comprises two guide elements each extending in the conveying direction and arranged in parallel below the two circulating drive belts which said two guide elements are configured for sliding guidance of deflecting elements arranged on the transport elements.

5. The apparatus according to claim 4, wherein the deflecting elements are each arranged on the transport elements of one of the transport element pairs on opposing guiding sides of the transport elements.

6. The apparatus according to claim 4, wherein the guide elements each comprise a stationary guide rail and, in the at least one transfer region, at least one adjustment element which is configured to be controllably movable by the control device and which is configured to guide the deflecting elements slidingly in a guiding position and to enable guidance of the deflecting elements in a deflecting position.

7. The apparatus according to claim 6, wherein the at least one adjustment element has at least one guide surface which is configured to be controllably pivotable by the control device about an axis of rotation running in the conveying direction.

8. The apparatus according to claim 6, wherein the at least one adjustment element comprises plural adjustment elements arranged in the manner of a cross in a cross-section containing the axis of rotation.

9. The apparatus according to claim 6, wherein the control device is utilized for controlling the at least one adjustment element and is operatively connected in each case to a drive unit, wherein the drive unit comprises a controllable actuator for producing a transverse movement and a conversion unit configured to convert the transverse movement into at least one rotational movement, said conversion unit being configured to pivot the at least one guide surface of the at least one adjustment element about the axis of rotation.

10. The apparatus according to claim 9, wherein the conversion unit comprises two curve control parts, wherein a first curve control part is arranged on the controllable actuator and a second curve control part is arranged on the at least one adjustment element, wherein the first and second curve control parts have correspondingly formed cam pairs directed towards each other.

11. The apparatus according to claim 10, wherein a first of the cam pairs is configured to convert the transverse movement of the controllable actuator into a rotational movement of the second curve control part relative to the first curve control part and a second of the cam pairs is configured to transfer the transverse movement of the controllable actuator to the second curve control part in an operating direction of the controllable actuator.

12. The apparatus according to claim 9, wherein the at least one adjustment element is spring-tensioned so as to be axially displaceable against an operating direction of the controllable actuator by a spring element and an axial bearing, such that in the guiding position the at least one adjustment element is in the idle position in respect of its axial position, while in the deflecting position the at least one adjustment element is in a released position in respect of its axial position.

13. The apparatus according to claim 12, wherein a first control crown is arranged on the at least one adjustment element, which said first control crown is configured in the idle position with form-fitting engagement in a stationary second control crown for locking a rotation of the first control crown, and wherein the first and second control crowns are further configured to assume a non-form-fitting state in the released position.

14. The apparatus according to claim 4, wherein the deflecting elements are rod-shaped.

15. The apparatus according to claim 3, wherein the respective axles are rod-shaped and are arranged on both sides of the two circulating drive belts by pivot bearings.

16. A method for transferring articles used in a fish and meat processing industry to a predetermined end position, comprising:
conveying the articles in a conveying plane by a circulating continuous conveying device with a plurality of transport sections which are configured for individually receiving the articles in a conveying direction,
wherein each of the transport sections comprises, in a conveying position, a transport element pair forming two article support surfaces and each transport element of the transport element pair is configured to be controllably pivotable about axles running in an edge region of the respective transport section, each transport element having a form in a manner of a grid,
wherein the method further comprises either:
controlled transfer of the articles under the effect of gravity into the predetermined end position in at least one transfer region in a plane lying below the conveying plane by controlled pivoting of the transport element pair using a control device while retaining an article orientation, or
controlled transfer of the articles into the predetermined end position by controlled pivoting of one of the transport element pair using a control device while changing an article orientation.

17. The method according to claim 16, further comprising centering the articles in the conveying position by inclining the transport element pair towards a center of the respective transport section in each case such that the article support surfaces each form a receiving trough for one of the articles.

18. The method according to claim 16, further comprising driving the transport element pair of the continuous conveying device by circulating drive belts arranged parallel to each other and extending in the conveying direction, between which the respective transport elements are pivotable about the axles running in the edge region of the respective transport section.

19. The method according to claim 18, further comprising utilizing a sliding guidance of deflecting elements arranged on the transport element pair by two guide elements of the continuous conveying device, extending in each case in the conveying direction and arranged in parallel below the circulating drive belts.

20. The method according to claim 19, further comprising utilizing a one-sided guidance in each case of the deflecting elements, in each case on opposing guiding sides of one of the transport element pairs.

21. The method according to claim 19, further comprising utilizing a sliding guidance of the deflecting elements in a guiding position by a stationary guide rail of the two guide elements in each case and enabling of the deflecting elements in a deflecting position in the at least one transfer region by at least one adjustment element which can be controlled via the control device.

22. The method according to claim 21, further comprising utilizing a controllable pivoting of at least one guide surface of the at least one adjustment element about an axis of rotation running in the conveying direction by the control device.

23. The method according to claim 21, further comprising controlling a drive unit by the control device to produce a transverse movement by a controllable actuator and conversion of the transverse movement into at least one rotational movement by a conversion unit configured therefor, in order to pivot the at least one guide surface of the at least one adjustment element about the axis of rotation.

24. The method according to claim 23, wherein the at least one rotational movement is produced by two curve control parts of the conversion unit, in that a first curve control part is arranged on the controllable actuator and a second curve control part is arranged on the at least one adjustment element, wherein the first and second curve control parts have correspondingly formed cam pairs directed towards each other.

25. The method according to claim 24, further comprising converting the transverse movement of the controllable actuator into a rotational movement of the second curve control part relative to the first curve control part by a first cam pair and transferring the transverse movement of the controllable actuator to the second curve control part in an operating direction of the controllable actuator.

26. The method according to claim 24, wherein in the guiding position the at least one adjustment element is in idle position in respect of its axial position, while in the deflecting position the at least one adjustment element is in a release position in respect of its axial position, in that the at least one adjustment element is spring-tensioned so as to be axially displaceable against the operating direction of the controllable actuator by a spring element and an axial bearing.

27. The method according to claim 26, further comprising utilizing a positive locking engagement in a stationary second control crown for locking the rotation of the first control crown in the idle position and for setting the control crowns of a non-positive locking state in the released position.

28. A fish or meat processing industry apparatus configured for transferring fish or meat processing industry articles to a predetermined end position, the apparatus comprising
  a circulating continuous conveying device configured to convey the fish or meat processing industry articles in a conveying plane;
  said circulating continuous conveying device comprising a plurality of transport sections configured to individually receive the fish or meat processing industry articles and to be movable in the conveying direction;
  each of plurality of transport sections comprising a transport element pair forming two article support surfaces and each said transport element having a form in a manner of a grid; and
  each transport element being configured to pivot about an axle extending along an edge region of a respective transport section,
  wherein the fish or meat processing industry apparatus has the following mode of operation:
    a transfer mode wherein the fish or meat processing industry articles are transferred into the predetermined end position in at least one transfer region under the effect of gravity in a plane lying below the conveying plane, and
  wherein, during the transfer mode, a control device causes a controlled pivoting of one of:
    a respective transport element pair which results in the fish or meat processing industry article retaining an article orientation of the fish or meat processing industry article, or
    one transfer element of a respective transport element pair which results in the fish or meat processing industry article changing an article orientation of the fish or meat processing industry article.

\* \* \* \* \*